(No Model.) 2 Sheets—Sheet 2.

G. W. PACKER.
DISK HARROW SEEDER.

No. 505,534. Patented Sept. 26, 1893.

Witnesses:
C. C. Burdine
W. Hume Henderson

Inventor
George W. Packer
By John G. Manahan
his Atty.

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

DISK HARROW-SEEDER.

SPECIFICATION forming part of Letters Patent No. 505,534, dated September 26, 1893.

Application filed May 11, 1893. Serial No. 473,812. (No model.)

*To all whom it may concern:*

Be it known that I, GEORGE W. PACKER, a citizen of the United States, residing at Rock Falls, in the county of Whiteside and State of Illinois, have invented certain new and useful Improvements in Disk Harrow-Seeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in disk harrow seeders, and pertains first, to novel, simple, and efficient, means of rotating the seed shaft by and from the axle of one of the disk gangs. Second, a novel and simple mode of placing a supplemental disk between the inner ends of the disk gangs, and means for readily raising said disk out of engagement with the earth, when turning the machine.

As my improvements are adapted for attachment to, and use with nearly, or quite, all of the common types of disk seeders, and the general construction of the latter is well known, I do not deem it necessary to show or describe the entire machine further than will be essential to a clear understanding of the location and operation of my improvements.

I attain the purposes aforesaid by the mechanism illustrated in the accompanying drawings, in which—

Figure 1:
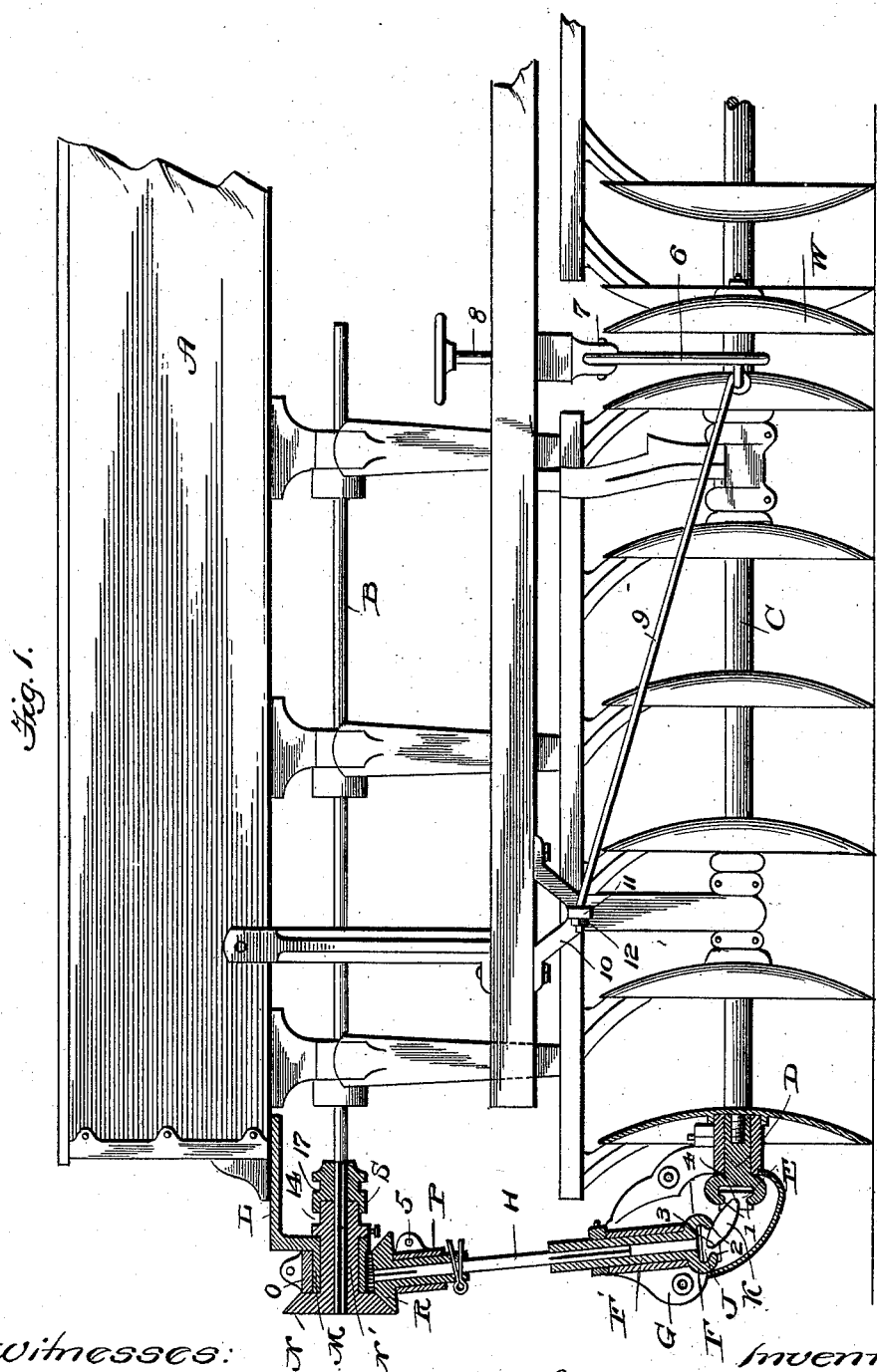
Figure 2:
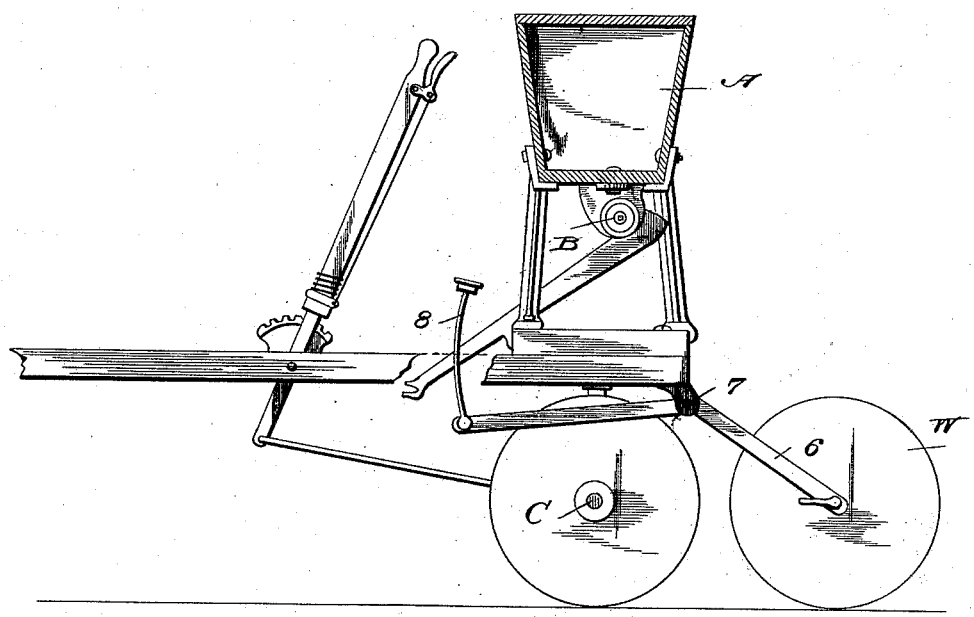
Figure 3:
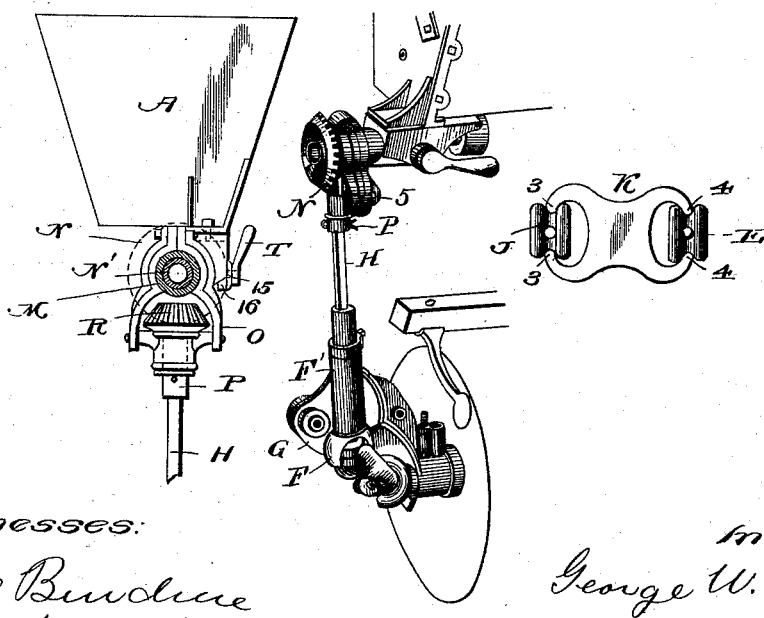

Figure 1 is a rear elevation of one end of a disk seeder embodying my improvements, a portion of the said shaft driving mechanism being in longitudinal section. Fig. 2 is a longitudinal vertical section through about the center of the machine. Fig. 3 contains details of the connections at each end of the driving shaft, which is located between the gang axle and the seed shaft.

Similar letters and figures refer to similar parts throughout the several views.

A is the usual seed hopper, suitably seated transversely of the machine, and provided with the seed shaft B, which latter in its rotations discharges the seed from the seed cups in measured quantities, in any of the usual modes.

C is the axle of one of the disk gangs, on the outer end of which there is screwed the grip D, which is provided at its outer end with mutually approaching engaging round jaw points 1, adapted to be inserted oppositely within a knuckle block E, which latter is thereby pivotally held in the outer end of grip D.

F is a longer grip, loosely journaled in block G, suitably supported on the outer end of the disk gang, and adapted at its upper end to receive the lower end of the vertical shaft H. The lower end of the grip F is provided, like the grip D, with mutually approaching jaw points 2 adapted to be inserted oppositely in a second knuckle block J, pivoted upon the points 2.

K is an intermediate knuckle, provided at each end with like jaw engaging points 3—3, and 4—4, the points 4—4 being adapted to be inserted oppositely in the knuckle block E, and the points 3—3 to be oppositely inserted in the knuckle block J. The engaging jaw-points of the grips D and F enter the respective knuckle blocks E and J, in lines respectively perpendicular to the line of engagement with said blocks of said knuckle K.

The shank F' of the grip F is hollow, and the opening therein has square sides. The shaft H is supported at its upper end, as hereinafter described, and its lower end which is also of square formation, is inserted loosely a sufficient distance within the shank F' of grip F to receive rotation from said grip. Inasmuch as the end of the disk gang changes its altitude with the inequality of the ground, the grip F will not preserve a uniform height, therefore provision is made for the lower end of the shaft H to move back and forward in the shank F', as the adjacent end of the disk gang may rise or fall.

A bracket L is attached to the end of the seed hopper A, and extending downward is provided with a horizontal transverse sleeve M. A beveled pinion N, provided with sleeve N', is loosely supported within the sleeve M by the sleeve N' being loosely placed over the seed shaft B and projected through sleeve M, and suitably held from slipping outward.

A stirrup O is hung over the sleeve M, and projected a sufficient distance below the latter to support a vertical box P, which latter is pivotally connected to said stirrup at one side at 5, so as to permit a slight oscillation to box P to prevent binding on shaft H, which is journaled in said box.

The shaft H is provided, at its upper end, with a beveled pinion R, adapted to engage and actuate the pinion N. The pinion R is keyed to the upper end of the shaft H above box P, and when the pinion R rests upon the box P it supports the shaft H loosely within the shaft F', as aforesaid.

The grain shaft B passes loosely through the pinion N and its sleeve N', said shaft at that point being round, and the inner end of sleeve N' is provided with a clutch-like formation 14 to optionally be engaged by a clutch S, having a square opening and carried on the grain shaft B, and adapted to be optionally thrown in and out of engagement with the clutch end of the sleeve N' by the short lever T. Shaft B being square, where it passes through clutch S, the engagement of said clutch rotates said shaft B.

The lever T is attached to a short horizontal shaft 15, suitably pivoted in the frame of the machine, and provided eccentrically at its upper end with the engaging point 16, adapted to project loosely into the annular recess 17 in the cylinder portion of clutch S. By throwing the lever T toward the outer end of the machine, the clutch S is disengaged from sleeve N', and the rotation of shaft B suspended. A reverse movement of lever T will engage clutch S with sleeve N', when the rotation of the latter will be communicated to shaft B.

By the mechanism just described, the continuous rotation of the disk gang axle C imparts a continuous rotation to the shaft H, which, through the medium of pinions R and N, imparts continuous rotation to the sleeve N', and when connection is established, by means of the clutch S, between the grain shaft B and the sleeve N', said rotation is continued to said shaft B. A supplemental disk W is adapted to be seated in the line of, and slightly to the rear of, the interval between the inner ends of the disk gangs, by means of the bent lever 6 intermediately fulcrumed to the frame of the machine at 7, and projected from such fulcrumed point forward of the main frame of the machine, and there provided with an upwardly projecting arm 8 adapted to be depressed by the driver's foot, the disk W, being attached to the rear end of lever 6. As the disk W is preferably located in the rear of the transverse line of the disk gangs, the machine will not be susceptible of being turned without some device for lifting the disk W from the earth. This result is attained, in very simple form, by the use of the lever 6, carrying the arm 8. The side pressure upon the disk W, when in use, is counteracted by a transverse rod 9 attached at its inner end to the box, or other bearing, of the disk W, and adjustably connected at its outer end to one of the hangers 10 of the machine. The fulcrum 7 is sufficiently loose to allow a slight lateral movement to the disk W, and the outer connection of the rod 9 to the hanger 10 is through a lug 11, formed on the rear of said hanger. The outer end of the rod 9 is threaded and a suitable nut 12 seated thereon, and against the outer face of the lug 11, which serves as a means of adjusting the position of the disk W with reference to the line of movement of the machine, and thereby regulates the depth of cut of said disk.

The advantage of my invention consists in the fact that the mode of driving the seeding devices from the end of the disk gang is of a character that will not be clogged by the accumulation of earth or rubbish, as is the case with gear of any kind located at any point. The gang axle is so near the surface of the ground when the disks are in operation as that more or less accumulation of rubbish is carried up by the end disk at the end of the axle, and in the use of gearing, particularly if the ground be damp, the accumulation necessitates frequent stoppages and cleanings, and sometimes entirely suspends the operation of the seed shaft.

It is absolutely essential that there be no interruption in the rotation of the seed shaft during the movement of the machine, or there will be a resultant area of the ground not sown. Therefore, the very valuable quality in the method of driving the seed shaft here shown is that there is absolutely no possibility of the gang axle C rotating without communicating its rotation to the seed shaft B.

The advantage of the other department of my invention consists in the simplicity of the construction shown,—its consequent economy, ease, certainty of control, and convenience of adjusting the cutting depth of the disk W.

What I claim as my invention, and desire to secure by Letters Patent of the United States, is—

1. In a disk harrow seeder, the combination of grip D, suitably attached to one of the axles of the disk gang, knuckle block E pivotally seated in grip D, box G suitably supported from the gang axle, grip F pivotally seated in knuckle block J and provided with shaft F' loosely seated in box G, knuckle K, provided with engaging jaws 3 and 4 adapted, respectively, to engage grips D and F, a shaft H supported loosely within the shaft F', seed shaft B, and means, substantially as shown, for communicating the rotation of shaft H to shaft B, for the purpose described.

2. The combination of the seed shaft B, pinion N provided with sleeve N' loosely seated on said shaft, and further provided with clutch end 14, clutch S, provided with annular recess 17, and seated on shaft B in condition to be rotated therewith, a vertical shaft 15 provided with eccentric point 16, adapted to rest in said recess, lever T seated on shaft 15 adapted to optionally throw the clutch S into and out of engagement with sleeve N', vertical shaft H, pinion R seated on shaft H adapted to engage and actuate pinion N, and means substantially as shown for rotating shaft H, for the purpose specified.

3. The combination of the seed shaft B, gang axle C, grip D, knuckle blocks E and J, knuckle K, suitably supported grip F provided with hollow shank F', shaft H supported loosely within said shank, and provided at its upper extremity with pinion R, pinion N loosely seated on shaft B in position to be engaged by pinion R, and means substantially as shown for locking said pinion N on the shaft B, for the purpose described.

4. In a disk harrow, the combination of lever 6 suitably fulcrumed longitudinally to the frame of the machine, and projected from said fulcrumed point forward and back, disk W seated on the rear end of said lever, means for laterally bracing said disk against the pressure of the earth an operating arm 8, projected from the front end of said lever, substantially as shown, and for the purpose described.

5. The combination of the lever 6, centrally fulcrumed to the frame of the machine, the disk W seated on the rear end of said lever, rod 9 connected at one end to the box of said disk, and extended transversely of the machine, and adjustably attached at its opposite end to the frame of the machine; substantially as shown, and for the purpose described.

In testimony whereof I affix my signature in presence of two witnesses.

GEORGE W. PACKER.

Witnesses:
JOHN G. MANAHAN,
MATTIE W. BARRETT.